(12) United States Patent  (10) Patent No.: US 9,228,330 B1
Brown et al.  (45) Date of Patent: Jan. 5, 2016

(54) SINK WITH COLORED LIGHTS FOR INDICATING WATER TEMPERATURE

(71) Applicants: Brian A. Brown, Alamo, CA (US); Gregory A. M. Brown, Incline Village, NV (US)

(72) Inventors: Brian A. Brown, Alamo, CA (US); Gregory A. M. Brown, Incline Village, NV (US)

(73) Assignee: International Patent Development Group, LLC, Incline Village, NV (US)

( * ) Notice: Subject to any disclaimer, the term of this patent is extended or adjusted under 35 U.S.C. 154(b) by 72 days.

(21) Appl. No.: 14/284,143

(22) Filed: May 21, 2014

Related U.S. Application Data

(62) Division of application No. 13/441,857, filed on Apr. 7, 2012, which is a division of application No. 12/716,954, filed on Mar. 3, 2010, now abandoned.

(60) Provisional application No. 61/157,489, filed on Mar. 4, 2009.

(51) Int. Cl.
*E03C 1/18* (2006.01)
*G01K 1/02* (2006.01)

(52) U.S. Cl.
CPC .... *E03C 1/18* (2013.01); *G01K 1/02* (2013.01)

(58) Field of Classification Search
CPC .......................................................... E03C 1/18
USPC .................................................... 4/619–660
See application file for complete search history.

(56) References Cited

U.S. PATENT DOCUMENTS

| | | | |
|---|---|---|---|
| 3,451,068 A | 6/1969 | Phillips | |
| 3,508,282 A | 4/1970 | Phillips | |
| 3,813,706 A * | 6/1974 | Williams | A47K 1/04 264/309 |
| 4,158,243 A * | 6/1979 | McCann | E03C 1/186 4/628 |
| 5,819,335 A * | 10/1998 | Hennessy | E03C 1/18 4/584 |
| 6,029,699 A | 2/2000 | Granot | |
| 6,038,519 A | 3/2000 | Gauthier et al. | |
| 6,912,741 B1 * | 7/2005 | Noh | B05B 1/169 239/17 |
| 6,957,452 B2 | 10/2005 | Grant | |
| 8,006,712 B2 * | 8/2011 | Boey | E03C 1/057 137/15.17 |
| 8,296,875 B2 * | 10/2012 | Loberger | E03C 1/057 4/623 |
| 8,499,375 B2 * | 8/2013 | Kim | F16L 25/08 239/463 |
| 9,157,219 B2 * | 10/2015 | Gibson | E03C 1/18 |
| 2004/0103473 A1 * | 6/2004 | Piatt | A47K 1/04 4/619 |
| 2006/0191064 A1 | 8/2006 | Tan | |
| 2008/0109956 A1 * | 5/2008 | Bayley | E03C 1/057 4/623 |
| 2009/0056011 A1 | 3/2009 | Wolf et al. | |
| 2009/0077736 A1 * | 3/2009 | Loberger | E03C 1/057 4/623 |
| 2009/0119832 A1 | 5/2009 | Conroy | |
| 2010/0125945 A1 * | 5/2010 | Hashem | E03D 11/02 4/619 |
| 2012/0084911 A1 * | 4/2012 | Kim | F16L 25/08 4/619 |

* cited by examiner

*Primary Examiner* — Lori Baker
(74) *Attorney, Agent, or Firm* — David Pressman

(57) ABSTRACT

An aesthetically designed sink (100) comprises a plurality of orifices (110, 115, 120, 125) that deliver different water flow profiles for washing, rinsing, and drinking. Hot and cold water supplies (1110, 1115) supply water to the sink. A series of touch and sliding-touch controls (130-180) regulate the temperature and flow of water from the orifices. A logic circuit (1105) controls all operations, i.e., orifice selection, flow rate, and temperature. In one aspect water flowing from an orifice forms a sheet-shaped stream that arcs over the bowl for ease of washing and drinking. The stream can be illuminated by bi-color light-emitting diodes (121) in colors indicative of the selected temperature of the water flowing through that orifice. Alternatively an orifice is replaced by a removable fixture (900) in a cavity (905) in the sink, which is connected to the water supply (910).

20 Claims, 6 Drawing Sheets

SINK WITH COLORED LIGHTS FOR INDICATING WATER TEMPERATURE

CROSS REFERENCE TO RELATED APPLICATIONS

This application is a division of application Ser. No. 13/441,857, filed 2012 Apr. 7, which is a division of application Ser. No. 12/716,954, filed 2010 Mar. 3. The '954 application claims priority of my provisional patent application, Ser. No. 61/157,489, filed 2009 Mar. 4.

BACKGROUND

Prior Art

The following is a list of some prior art of which I am presently aware:

| Pat. or Pub. Nr. | Kind Code | Issue or Pub. Date | Patentee or Applicant |
| --- | --- | --- | --- |
| 3,451,068 | B1 | 1969 Jun. 24 | Phillips |
| 3,508,282 | B1 | 1970 Apr. 28 | Phillips |
| 4,158,243 | B1 | 1979 Jun. 19 | McCann |

In his '068 and '282 patents, Phillips shows sinks comprising sumps, counters, and consoles. The consoles reside above the sinks and house compartments and concealed lavatory accessories, such as soap dispensers.

McCann shows a sink comprising a bowl, ledge, and handles for water valves and a drain designed to prevent water drips from falling onto either the ledge surface or the handles. The levers for operating the water valves and pop-up drain are in a substantially horizontal plane defined by the rim of the sink bowl. The water valve operating levers are a part of the rim of the bowl and the pop-up drain control valve is located inside the rim of the lavatory, next to the operator. He also shows a removable soap dish and a combination water spout and spray that is movable or detachable for use as a hand spray.

While these prior lavatories function as intended, they provide water flow from above, requiring users to inconveniently cup their hands to drink water and rinse their face after washing. Also they lack versatility and have other disadvantages.

SUMMARY

In a first embodiment, a sink design has several advantages, including allowing users to drink water and rinse their face after washing without first filling their cupped hands with downward-flowing water from a spigot. In addition, my design provides an arching sheet-shaped stream that can be directed onto one's hands, either from above or below. Additional embodiments show features that further improve on prior-art sink designs, including electronic touch controls, a spigot for drinking, a water temperature indicator, and more.

DRAWING FIGURES

REFERENCE NUMERALS

100 Bowl
101 Wall
102 Wall
103 Lip
104 Overflow drain
105 Drain
110-120 and 125 Orifices
121 Indicator
130-180 Controls and Indicators
900 Head
905 Cavity
910 Hose
1100 Electrical source
1105 Logic circuit
1110 Water supply
1115 Water supply
1120 Valve
1125 Valve
1130 Manifold
1135-1145 Valve
1150 Drain valve
1200-1250 Steps

DETAILED DESCRIPTION

First Embodiment

Figure 1:
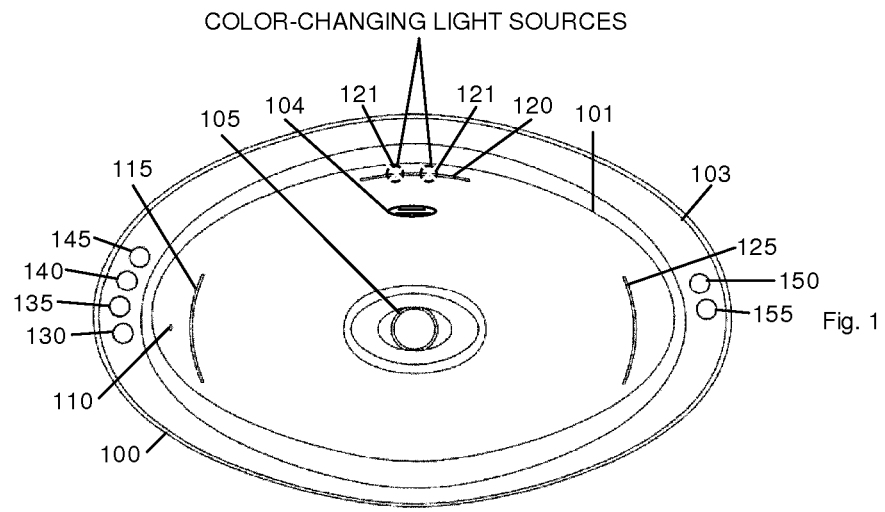
FIGS. 1 through 3 are a top, front, and side perspective views, respectively, of a sink according to a first embodiment.
Figure 2:
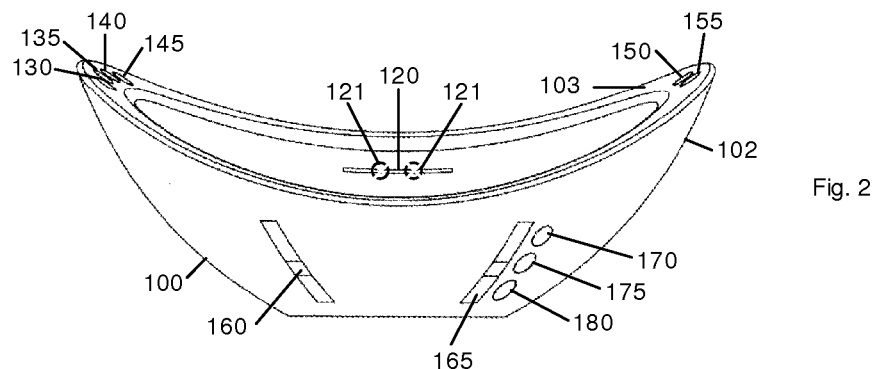
Figure 3:
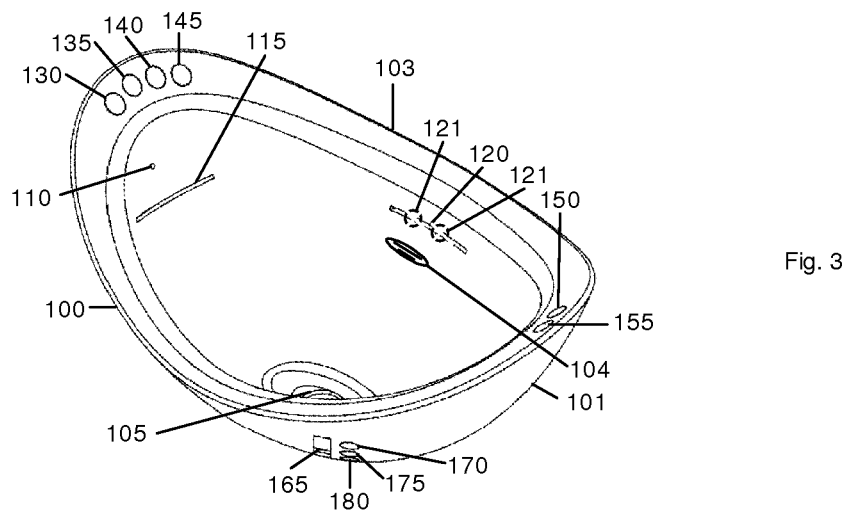

Sink Apparatus—FIGS. 1-3

FIGS. 1 through 3 are top, front perspective, and side perspective views of a sink according to one aspect of a first embodiment. The sink comprises a bowl 100 with an exterior wall 102, an interior wall 101, an upper lip 103, an overflow drain 104, a drain 105, a plurality of generally upwardly directed orifices 110, 115, 120, and 125, and a plurality of controls and indicators 121 and 130-180. Orifice 110 is circular and is on the upper, left side of wall 101 of bowl 100; orifice 115 is an elongated slit on the left side under orifice 110, orifice 120 is an elongated slit located near the top, rear of wall 101, and orifice 125 is an elongated slit on the upper, right side of wall 101.

Walls 101 and 102 are separated by an interior space (not shown) that houses concealed plumbing and electrical connections (described below).

Controls and indicators 130-180 control the flow and temperature of water in the sink. These controls perform the following functions: controls 130-140 select the type of flow, specifically control 130 starts and stops the flow of water from slots 115 and 125, and controls 135 and 140 control the flow from orifices 120 and 110, respectively. Control 145 closes and opens drain 105 and controls 150 and 155 are ON and OFF controls respectively. Control 160 (FIG. 2) controls the volume of the flow control and control 165 is a temperature control. Controls 170, 175, and 180 are preset temperature selector controls; e.g., pressing control 170 sets the water temperature to a cold temperature of about 10° C., control 175 sets it to a warm temperature, about 40° C., and control 180 sets it to a hot temperature, about 60° C. One or more additional indicator lights 121 (FIG. 1) are included in one aspect of an alternative embodiment, described below. The use of these controls is described in greater detail below.

The sink can be made of plastic, ceramic, metal, glass, wood, or a combination of these materials. The sink can be coated with various substances, including varnish, paint, topcoat, or lacquer. Controls and indicators 130-180 are preferably well-known capacitive touch controls of the type supplied by many printed circuit vendors and controlled by an integrated circuit. Such an integrated circuit may be a type CY3280 Universal controller, manufactured by Cypress Semiconductor Co., of San Jose, Calif., and sold under the trademark CapSense. Controls 130-180 can be located on exterior wall 102, on lip 103, or on both surfaces as shown in FIGS. 1-3. The electrically conducting parts of these controls are typically insulated from user contact by a thin layer of insulating material, usually plastic. Controls 130-155 and 170-180 can also be well-known tactile dome membrane switches or mechanical pushbuttons, all of which are arranged to provide a signal to a controller.

Operation—FIGS. 4 through 8

Figure 4:
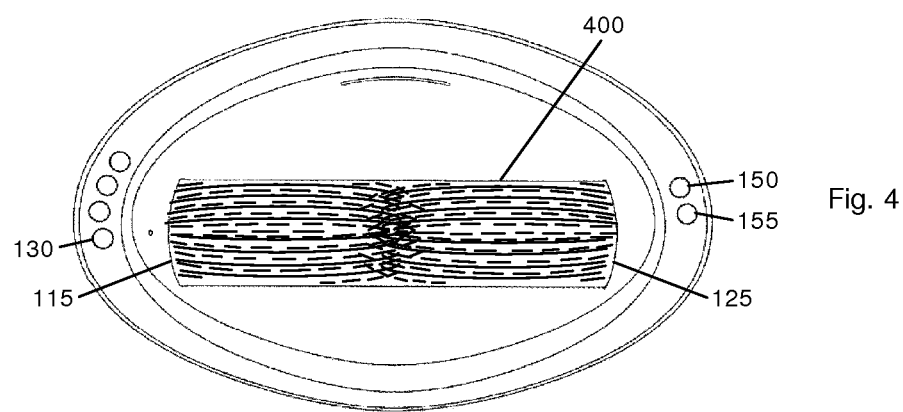
FIGS. 4 through 6 are top, front (elevation), and side perspective views, respectively, that show water flow emanating from the side walls of the embodiment of FIG. 1.
Figure 5:
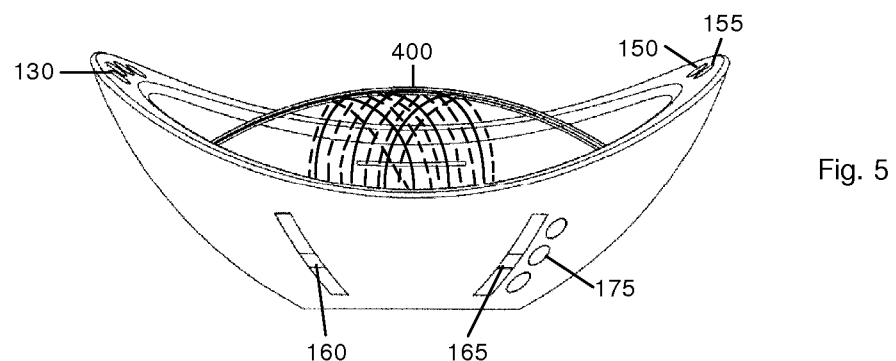
Figure 6:
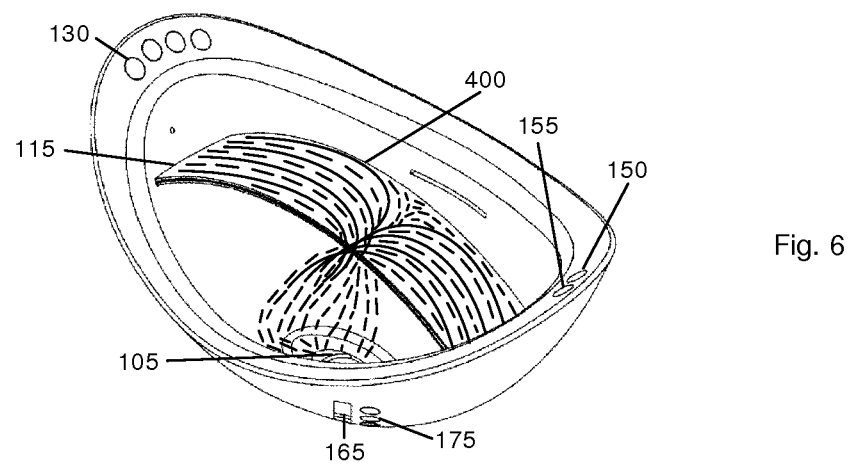

FIGS. 4 through 6 show operation of one aspect of the present embodiment, namely the activation of water flow for use in washing one's face. To provide a suitable flow pattern, the user first presses or touches ON control 150 to energize or turn on the circuit within the sink. Then the user touches control 130, thereby starting flow of water 400 through slots 115 and 125. Next, sliding control 160 is adjusted for the proper flow rate of water 400 so that the streams from slots 115 and 125 are directed between the horizontal and the vertical as shown, at a slight angle upward from the horizontal and meet gently near the center of the sink where they collide and fall downward toward drain 105 (FIG. 6) and finally exit the sink. Since orifices 115 and 125 are elongated slits or slots (narrow in one direction and long in a perpendicular direction), streams 400 from these slots will each have a cross-section which is narrow or flat in one direction perpendicular to the direction of flow and long or wide in a direction perpendicular to the one direction and to the direction of flow, as shown. I.e., streams 400 will be sheet or wall shaped. Orifices 115 and 125, as well as orifices 120 in FIG. 7, thus constitute orifice means that, when supplied with water under pressure, emit a sheet-shaped stream of water having a rectangular cross-section which is relatively wide horizontally and relatively narrow vertically, where the stream is directed at an upward angle between the horizontal and the vertical and then curves downward to form a curved arc over the bowl. Orifice 110 in FIG. 8 has a similar function, except that its stream is circular.

A single stream from slot 115 or slot 125 that hits the opposite wall from the slot can alternatively be used. When the flow rate is satisfactory, control 175 is pressed to select a predetermined "warm" temperature. Alternatively, the temperature is set by moving sliding control 165. The sink is now ready for use.

The user inserts his or her face into the flowing water. Water rises upward from the sink to meet the user's face. Instead of cupping hands together and lifting water to splash on his or her face, the user's hands can wash the face directly with plenty of water for washing and rinsing. The user can also just dip his or her hands into the stream, sheet, or wall of water to rinse. When the sink is no longer needed, the user presses control 155, de-energizing the sink's controls and stopping the flow of water. Optionally, the user can select another flow option by pressing or touching one of controls 130, 140, or 145.

Figure 7:
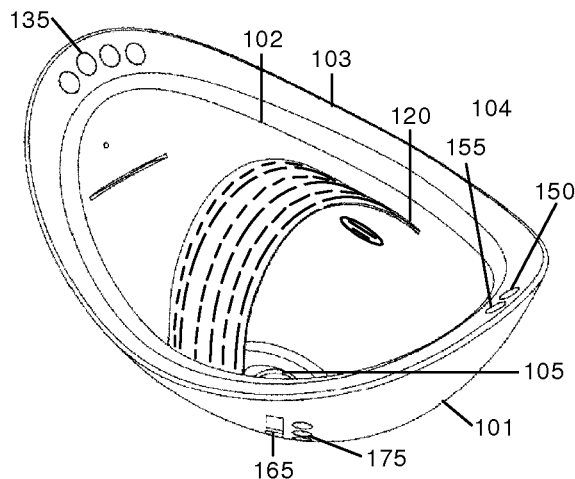
FIG. 7 is a side perspective view showing water flow emanating from the rear wall of the embodiment of FIG. 1.

FIG. 7 shows operation according to another aspect of the present embodiment, flow for washing hands. With the circuit in the sink energized, the user presses control 135 to start flow from orifice 120. This flow is sheet- or wall-shaped and arches upward and then curves down as shown from orifice 120 and splashes against the inside front surface of the sink then exits through drain 105. As shown in this aspect and in FIG. 5, the top or crest of the curve, arch, or arc of the sheet of water is over the center of the sink and drain. When finished, the user presses OFF control 155 or selects another flow option.

Figure 8:
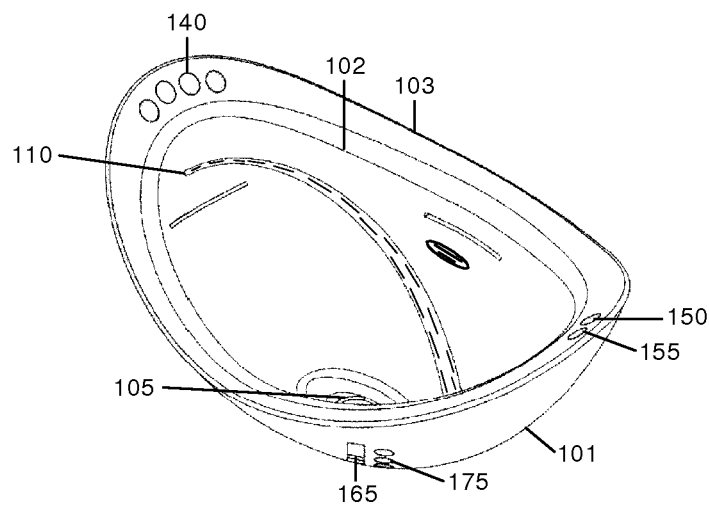
FIG. 8 is a side perspective view showing a water spout for drinking that emanates from one side of the embodiment of FIG. 1.

FIG. 8 shows operation according to yet another aspect of the present embodiment, flow for drinking. With the circuit in the sink energized, the user presses control 140 to start flow from orifice 110. When finished, the user presses OFF control 155 or selects another flow option.

Preferably, only one flow option is activated when one of selector controls 130-145 is pressed. However, by pressing two or more controls simultaneously, the user can activate the flows associated with those controls, if desired.

ALTERNATIVE EMBODIMENT

Figure 9:
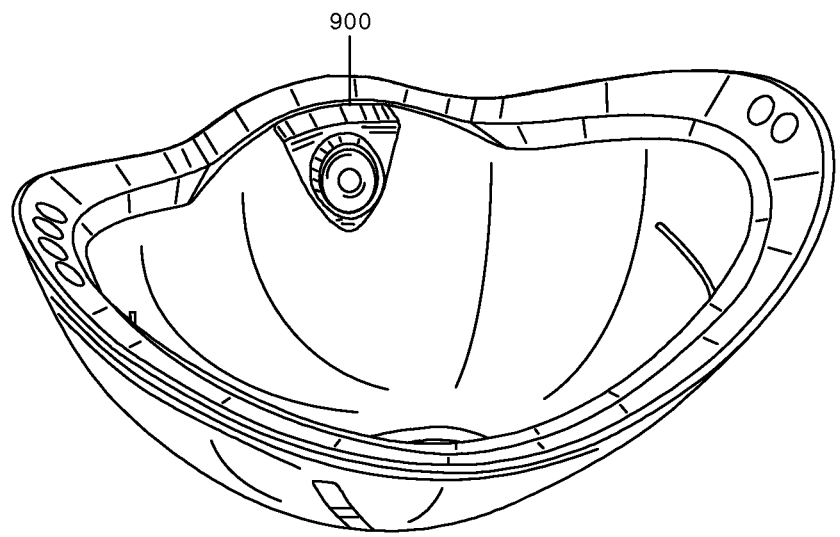
FIGS. 9 and 10 show front perspective views of a first alternative embodiment.
Figure 10:
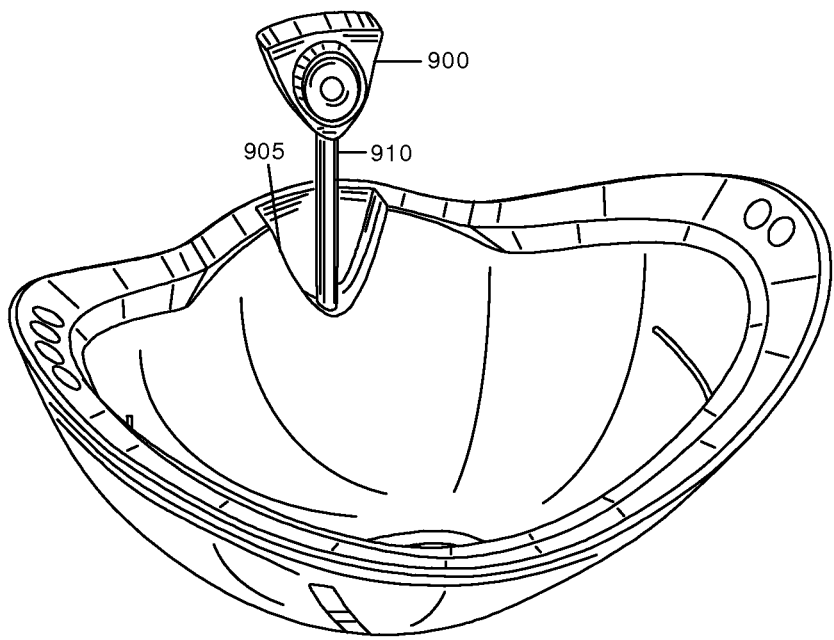

Description and Operation—FIGS. 9-10

Figure 11:
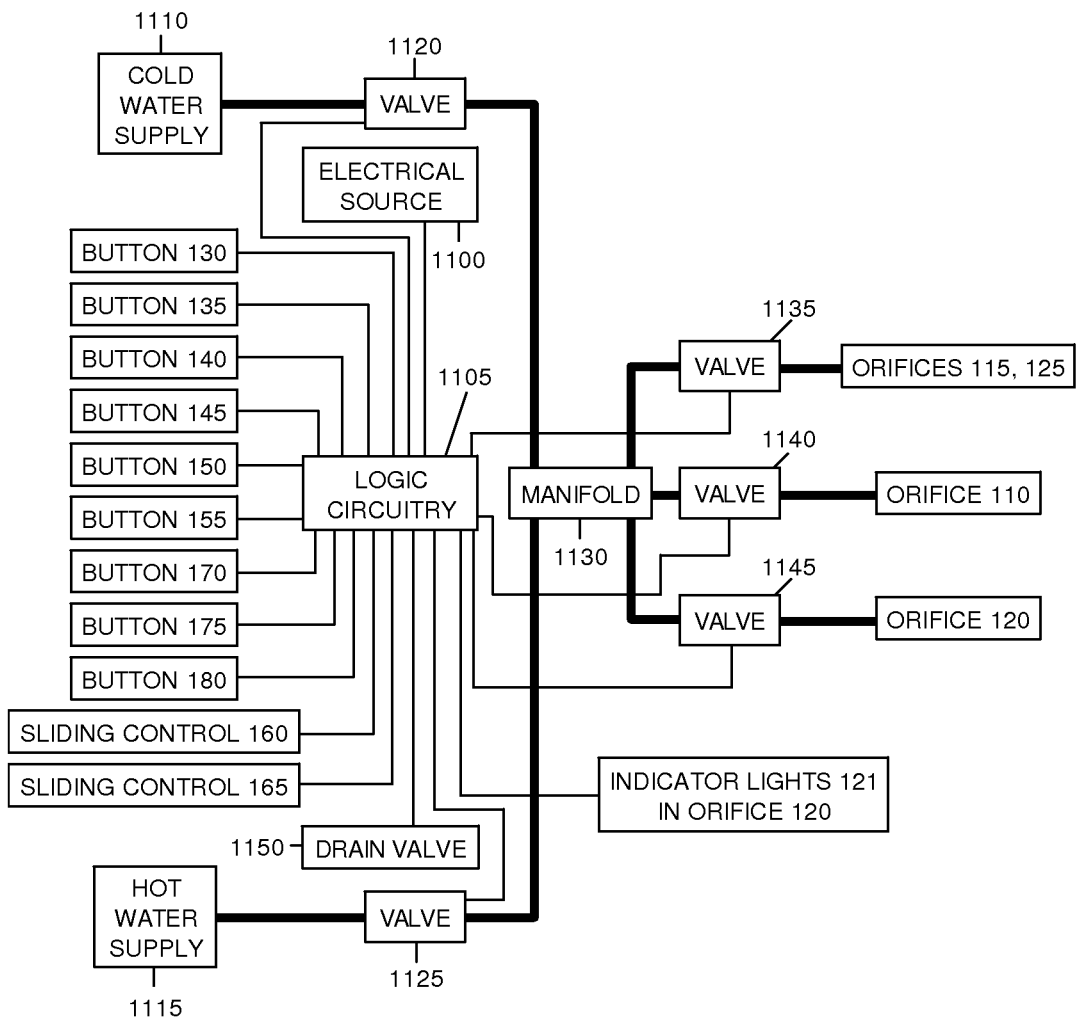
FIG. 11 shows a block diagram of circuit and plumbing used in all embodiments.

FIGS. 9 and 10 are perspective front views of an alternative embodiment. This embodiment is useful when washing one's hair, or an object that is held in the sink. Orifice 120 (FIG. 1) is replaced with a removable faucet head 900. A cavity 905 in the rear wall of the sink is shaped to hold head 900. In one aspect, head 900 remains in place in cavity 905 during use. In another aspect, head 900 is removed from cavity 905 during use (FIG. 10). In order to provide flow through head 900 when it is removed from cavity 905, a hose 910 connects head 900 to water valve 1145 (FIG. 11). Hose 910 is preferably flexible; however it can also be rigid in order to simply elevate the flow delivered by head 900.

In an alternative aspect of this embodiment, head 900 provide a simple direct flow type or bubbled flow. It can also be a shower-type head or a combination of types. Alternatively, head 900 can be interchangeable with a variety of types of heads.

Selection and operation of the various flow options in this embodiment of the sink is the same as described above for the preferred embodiment.

All Embodiments

Figure 12:
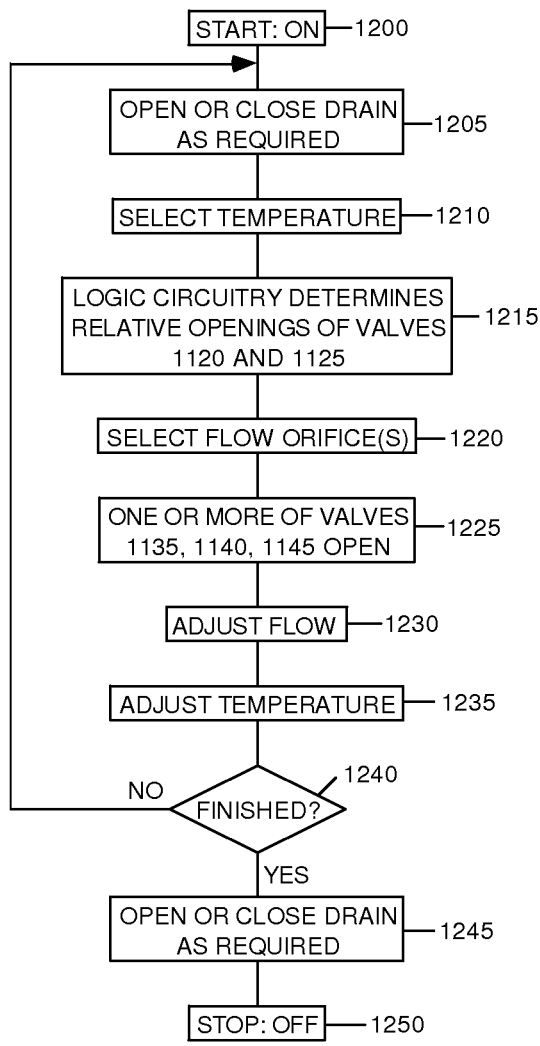
FIG. 12 shows a flow chart of the steps involved in operating the various embodiments.

Controls—Description and Operation—FIGS. 11 and 12

FIG. 11 is a block diagram showing connections between controls 130-180, logic circuit, and valves according to the preferred embodiment. Plumbing connections are shown in heavy lines; electrical connections are shown in lighter lines.

An electrical source 1100 is connected to power mains (not shown), or to batteries or a combination thereof. Source 1100 is preferably electrically isolated from the mains and has at least one output terminal grounded to earth in order to prevent the possibility of electrical shock to the user while operating the sink. Logic circuit 1105 is powered by source 1100 and controls all functions of the sink by receiving commands from a user through controls 130-180 and issuing commands to valves 1120, 1125, 1135-1145, and controls and indicators 130-180. Circuit 1105 is preferably a microprocessor, but can be combinatorial logic, or a field-programmable logic array. Circuit 1105 includes well-known drivers for valves and lights.

When selectively operated, controls 130-180 and indicator lights 121 (FIG. 1) cause circuit 1105 to perform various predetermined functions.

The sink is connected to cold and hot water supplies 1110 and 1115, respectively, via plumbing conduit as shown in heavy lines, valves 1120 and 1125, a manifold 1130, and valves 1135, 1140, and 1145. Drain 105 is connected to a sanitary sewer (not shown) via a valve 1150. The plumbing conduit, valves 1120 and 1125, manifold 1130, and valves 1135, 1140, and 1145, and all electrical connections can be concealed either between walls 101 and 102, or at another location, i.e., outside of walls 101 and 102 within a wall (not shown) near the sink, or a combination thereof.

All valves with the exception of drain valve 1150 are preferably solenoid valves that are normally-closed, i.e., their mechanisms are spring-loaded so that when power is disconnected, they revert to a closed position and remain there. This prevents water wastage. Valve 1150 is normally open so that water will drain from the sink when power is disconnected. A manually inserted stopper is used when the user wishes to fill the sink and retain the water therein while turning the sink controls OFF.

Valves 1120 and 1125 are suitable to be operated proportionally, i.e., they can be open, closed, or partially open. Such valves are type PSV, manufactured by Aalborg Instruments and Controls, Inc., of Orangeburg, N.Y. Suitable electronic drivers for these valves are the model PC10, sold by Miratron, Inc., of Portland, Oreg. The driver circuit is included within logic circuit 1105. The proportional feature permits the user to select the temperature of the water entering manifold 1130. Thus logic circuit 1105 and valves 1120 and 1125 constitute means for controlling the temperature of the water flowing to the orifice(s).

Valves 1135-1145 are selectively opened, depending on which of controls 130-180 are activated. Activating control 130 causes circuit 1105 to open valve 1135, enabling water flow through orifices 115 and 125, for example. Sliding controls 160 and 165 cause logic circuit 1105 to operate valves 1120 and 1125 in concert. Sliding control 160 regulates flow so that moving valve 160 causes valves 1120 and 1125 to be opened or closed either individually or at the same time. Sliding control 165 and controls 170-180 adjust the temperature of the water delivered to manifold 1130 by adjustably opening valve 1120 while adjustably closing valve 1125, or vice versa.

Controls 130-180 are optionally lighted when their function is activated. Controls 160 and 165 are optionally lit with one or more light sources, such as light-emitting diodes (LEDs) (not shown). For example, a red LED can be positioned at the top of control 165 to indicate the flow of hot water; and a blue LED can be positioned at the bottom of control 165 to indicate the flow of cold water. As the slider moves toward one or the other ends of the control, the brightness of the LED at that end grows brighter, while the brightness of the LED at the other end of the control grows dimmer. Similarly control 170 (hot) can be illuminated red when activated, with controls 175 and 180 not illuminated. Control 180 (cold) can be illuminated blue when activated, with controls 170 and 175 not illuminated and control 175 (warm) can be an intermediate color when activated, with controls 170 and 180 not illuminated. Controls 130-155 are optionally illuminated when activated.

In an alternative aspect of the preferred embodiment, LEDs 121 (FIG. 1) are arranged to shine through the water flow emanating from orifice 120. These are bi-color LEDs whose color is determined by activation from logic circuit 1105 in well-known fashion. The color of LEDs 121 mirrors the setting of sliding control 165 so that when hot water is selected, red light shines through the water flowing from orifice 120 and when cold water is selected, blue light shines through the water flowing from orifice 120.

FIG. 12 is a flow chart showing operation of circuit 1105 and the various other components comprising the sink. At the start, step 1200, the sink's electronics are energized, i.e., the user turns the sink ON by pressing control 150 (FIG. 1).

Next, the user selects whether to open or close drain 105 by pressing control 145, step 1205. Repeated pressings of control 145 cause circuit 1105 to alternately open and close drain 105.

Next, the user selects the desired temperature by operating sliding control 165 or pressing one of controls 170-180, step 1210. In response to step 1210, circuit 1105 determines the relative openings of valves 1120 and 1125 required to deliver water at the selected temperature to the sink, step 1215.

The user then selects which of one or more orifices are to deliver water flow by pressing one or more of controls 130-40, step 1220. In response, circuit 1105 causes one or more of valves 1135-1145 associated with controls 130-140 to open, step 1225.

The user can then adjust water flow through the selected orifice by moving sliding control 160, step 1230. Similarly, the user can adjust the flowing water temperature by adjusting sliding control 165 or by pressing or touching one of controls 170-180, step 1235. The user then uses the sink as desired.

When the user has finished using the sink, step 1240, he or she opens or closes the drain as required, step 1245, and de-energizes the sink's electronics, stopping all functions of the sink and turning it OFF, step 1250.

CONCLUSION, RAMIFICATIONS, AND SCOPE

Accordingly the reader will see that, according to one or more aspects, I have provided an improved and far more versatile and ergonomic sink. The sink's user can select among orifices that deliver various kinds of water flow. The flow is generally upward, permitting the user to wash and drink from the sink without having to cup his or her hands in order to catch some water for delivery to their face. Water can be directed onto a user's hands either from above or below, facilitating easy washing and rinsing. The sink controls are electronic and operate with a touch or a sliding motion.

While the above description contains many specificities, these should not be construed as limitations on the scope, but as exemplifications of some presently preferred embodiments.

Many other ramifications and variations are possible within the teachings. For example, all aspects of the preferred embodiment are scalable to any size and to handle any volume of flow and retained water. The sink can be offered in any color and variations in shape are possible. Individual, springably openable covers can be provided to prevent debris from entering the orifices when they are not in use. The sink can be mounted on a pedestal or a table, or hung from a wall. Instead of the controls being located on the front and top, they can be located elsewhere on the sink. The shape of the sink or bowl can vary, e.g., it can be made rectangular, circular, triangular with rounded corners, etc. The controls can be relocated and even combined together. In lieu of individual controls for the respective functions, a single touch screen can be provided with all the controls and functions realized by respective touch points on the screen.

Thus the scope should be determined by the appended claims and their legal equivalents, and not only by the examples given.

The invention claimed is:

1. A lavatory sink, comprising:
    a bowl for holding or containing water,
    said bowl having a drain at its bottom, a rim at its top, and a wall extending between said drain and said rim,
    an orifice for supplying a stream of water out of said orifice and into said bowl for enabling a user to access said stream of water over or within said bowl,
    a conduit for supplying water to said orifice,
    at least one electrically operable valve in said conduit for controlling the supply of water to said orifice,
    at least one control unit arranged to issue actuating commands to said valve to cause said valve to open or close to control the flow of water flows through said valve and said orifice,
    a plurality of color-changeable light sources on said bowl and a selector for selecting the temperature of water flowing to said orifice and supplying said temperature to said control unit, wherein said control unit causes the color of said color-changing light sources to indicate the temperature of said water flowing to said orifice in response to said temperature supplied to said control unit,
    whereby a user may easily and directly access said stream for hand or face washing or drinking over or within said bowl and also know the temperature of said stream of water flowing out of said orifice by observing said light sources.

2. The sink of claim 1 wherein said control unit causes said plurality of color-changing light sources to supply a first color indicating the flow of cold water, a second color indicating the flow of hot water, and a third color comprising a combination of said first and said second colors to indicate the flow of water having a third temperature between said cold and hot temperatures.

3. The sink of claim 1 wherein said orifice is contained in said wall of said bowl.

4. The sink of claim 1 wherein said bowl has an oval-shaped rim and said orifice is positioned on a long side of said bowl.

5. The sink of claim 1 wherein said bowl has an oval-shaped rim and said orifice is positioned on a short side of said bowl.

6. The sink of claim 1 wherein said plurality of color-changing light sources are within said orifice for causing light to be emitted from said orifice to color the water emitted from said orifice.

7. The sink of claim 6 wherein said control unit causes said light sources to supply a first color indicating the flow of cold water, a second color indicating the flow of hot water, and a third color comprising a combination of said first and said second colors to indicate the flow of water having a third temperature between said cold and hot temperatures.

8. The sink of claim 1 wherein said control unit has a control and further including a logic circuit arranged to interpret the status of said control in order to operate said at least one valve proportionally so that flow of water through said at least one valve varies in proportion to said status of said control.

9. A lavatory sink, comprising:
    a bowl for holding or containing water,
    said bowl having a drain at its bottom, a rim at its top, and a wall extending between said drain and said rim,
    an orifice for supplying a stream of water out of said orifice and into said bowl for enabling a user to access said stream of water over or within said bowl,
    a conduit for supplying water to said orifice,
    at least one valve in said conduit for controlling the supply of water to said orifice,
    a plurality of color-changeable light sources on said bowl, the color of light emitted from said sources being visible to a user of said sink,
    a temperature-determining device for determining the temperature of water flowing to said orifice and causing the color of said plurality of color-changing light sources to indicate the temperature of water supplied to said orifice,
    whereby a user may easily and directly access said stream for hand or face washing or drinking over or within said bowl and also know the temperature of said stream of water flowing out of said orifice by observing said light sources.

10. The sink of claim 9 wherein said temperature-determining device causes said plurality of color-changing light sources to supply a first color indicating the flow of cold water, a second color indicating the flow of hot water, and a third color comprising a combination of said first and said second colors to indicate the flow of water having a third temperature between said cold and hot temperatures.

11. The sink of claim 9 wherein said orifice is contained in said wall of said bowl.

12. The sink of claim 9 wherein said bowl has an oval-shaped rim and said orifice is positioned on a long side of said bowl.

13. The sink of claim 9 wherein said bowl has an oval-shaped rim and said orifice is positioned on a short side of said bowl.

14. The sink of claim 9 wherein said plurality of color-changing light sources are within said orifice for causing light to be emitted from said orifice to color the water emitted from said orifice.

15. The sink of claim 14 wherein said temperature-determining device causes said light sources to supply a first color indicating the flow of cold water, a second color indicating the flow of hot water, and a third color comprising a combination of said first and said second colors to indicate the flow of water having a third temperature between said cold and hot temperatures.

16. The sink of claim 1 wherein said temperature-determining device has a control and further including at least one valve in said conduit and a logic circuit arranged to interpret the status of said control in order to operate saidat least one valve proportionally so that flow of water through said at least one valve varies in proportion to said status of said control.

17. A lavatory sink, comprising:
    a bowl for holding or containing water,
    said bowl having a drain at its bottom, a rim at its top, and a wall extending between said drain and said rim,
    an orifice for supplying a stream of water out of said orifice and into said bowl for enabling a user to access said stream of water over or within said bowl,
    a pair of conduits for supplying hot and cold water, respectively, to said orifice,
    each of said conduits having a valve for controlling the supply of water said conduit supplies to said orifice, a plurality of color-changeable light sources on said bowl, the color of light emitted from said sources being visible to a user of said sink, a temperature-determining device for determining the temperature of water flowing to said orifice and causing the color of said plurality of color-changing light sources to indicate the temperature of water supplied to said orifice, whereby a user may easily and directly access said stream for hand or face washing or drinking over or within said bowl and also know the temperature of said stream of water flowing out of said orifice by observing said light sources.

18. The sink of claim 17 wherein said temperature-determining device causes said plurality of color-changing light sources to supply a first color indicating the flow of cold water, a second color indicating the flow of hot water, and a third color comprising a combination of said first and said second colors to indicate the flow of water having a third temperature between said cold and hot temperatures.

19. The sink of claim 17 wherein said plurality of color-changing light sources are within said orifice for causing light to be emitted from said orifice to color the water emitted from said orifice.

20. The sink of claim 19 wherein said temperature-determining device causes said light sources to supply a first color indicating the flow of cold water, a second color indicating the flow of hot water, and a third color comprising a combination of said first and said second colors to indicate the flow of water having a third temperature between said cold and hot temperatures.

* * * * *